United States Patent
Grinrod

(10) Patent No.: US 10,584,272 B2
(45) Date of Patent: Mar. 10, 2020

(54) MICROSPHERE COMPOSITIONS AND METHODS FOR PRODUCTION IN OIL-BASED DRILLING FLUIDS

(71) Applicant: SCHLUMBERGER NORGE AS, Sandnes (NO)

(72) Inventor: Anders Grinrod, Sandnes (NO)

(73) Assignee: SCHLUMBERGER NORGE AS, Stavanger (NO)

( * ) Notice: Subject to any disclaimer, the term of this patent is extended or adjusted under 35 U.S.C. 154(b) by 91 days.

(21) Appl. No.: 15/371,394

(22) Filed: Dec. 7, 2016

(65) Prior Publication Data

US 2017/0158940 A1    Jun. 8, 2017

Related U.S. Application Data

(60) Provisional application No. 62/263,783, filed on Dec. 7, 2015.

(51) Int. Cl.
*C09K 8/36* (2006.01)
*E21B 21/00* (2006.01)

(52) U.S. Cl.
CPC .............. *C09K 8/36* (2013.01); *E21B 21/003* (2013.01); *C09K 2208/26* (2013.01)

(58) Field of Classification Search
CPC ...... C09K 2208/26; C09K 8/035; C09K 8/36; E21B 21/003
See application file for complete search history.

(56) References Cited

U.S. PATENT DOCUMENTS

| | | | |
|---|---|---|---|
| 7,503,404 B2 * | 3/2009 | McDaniel | E21B 43/25 166/308.1 |
| 2009/0205824 A1 | 8/2009 | Sullivan et al. | |
| 2009/0205829 A1 | 8/2009 | Sullivan et al. | |

FOREIGN PATENT DOCUMENTS

| | | |
|---|---|---|
| CN | 102626399 B | 5/2014 |
| EP | 0970705 A1 | 1/2000 |
| WO | 0187270 A2 | 11/2001 |

OTHER PUBLICATIONS

International Search Report and the Written Opinion issued in International Application No. PCT/EP2016/080109, dated Mar. 14, 2017 (18 pages).

* cited by examiner

*Primary Examiner* — Frances Tischler
(74) *Attorney, Agent, or Firm* — Osha Liang LLP

(57) ABSTRACT

A method includes admixing an aqueous polysaccharide solution into an oleaginous base fluid, and adding a divalent ion source to produce one or more polysaccharide microspheres.

8 Claims, No Drawings

MICROSPHERE COMPOSITIONS AND METHODS FOR PRODUCTION IN OIL-BASED DRILLING FLUIDS

CROSS REFERENCE TO RELATED APPLICATIONS

This application claims the benefit of U.S. Provisional Application No. 62/263,783 filed on Dec. 7, 2015, incorporated by reference herein in its entirety.

BACKGROUND

During the drilling of a wellbore, various fluids are used in the well for a variety of functions. The fluids may be circulated through a drill pipe and drill bit into the wellbore, and then may subsequently flow upward through wellbore to the surface. During this circulation, a drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

During drilling operations, variations in formation composition may lead to undesirable fluid loss events in which substantial amounts of wellbore fluid are lost to the formation through large or small fissures or fractures in the formation or through a highly porous rock matrix surrounding the borehole. In response to various types of formation damage and fluid loss, wellbore fluids may also be circulated downhole to deliver agents to treat or mitigate such problems. Treatment compositions may be water- or oil-based and may contain weighting agents, surfactants, proppants, viscosifiers, and fluid loss additives depending on the nature of the problem. For example, treatments may include physical treatments that contain viscosifying agents or particulate solids that reduce the mobility of fluids into formation defects or form aggregates that obstruct fractures or pores downhole, or chemical treatments that include polymer- or gel-forming components and cements that harden or set up to produce seals downhole.

DETAILED DESCRIPTION

In one aspect, the present disclosure relates to the use of polysaccharide compositions to encapsulate various materials for delivery and controlled release of materials in various wellbore operations. In one or more embodiments, polysaccharide microspheres may be prepared in an oleaginous base fluid and used directly or isolated and later recombined with a suitable base fluid. In some embodiments, polysaccharide microspheres may be disrupted in response to an external stimulus or triggering event, releasing any stored materials. Triggering events may include changes in temperature or pH; degradation of the polysaccharide encapsulant by enzymes, oxidants, or solvents; or physical disruption of the encapsulant, such as by shearing, grinding, pressure such as differential pressure, or crushing.

In one or more embodiments, polysaccharide microspheres may be produced using an emulsion-based assembly method that includes forming an internal phase containing a polysaccharide encapsulant in a water-in-oil or invert emulsion, followed by crosslinking the polysaccharide at the surface of microspheres. In particular, when the aqueous polysaccharide solution is mixed with the oil, the solution phase may separate to produce spheres that may harden and crosslink when a divalent ion source, such as calcium, is added. To this end, it is believed that adding the ion source creates ionic bonding at the surface of the water-in-oil droplets to create a hardened shell or crosslinkage. Following formation of the microspheres in the emulsified wellbore fluid, the fluid may then be used in a selected wellbore operation such as drilling, drill-in operations, productions, spot treatments, etc. In some embodiments, the polysaccharide microspheres may be isolated from an emulsion, and combined with a separate wellbore fluid or stored for future use.

In some embodiments, polysaccharide microspheres may be used as a carrier for an oil-soluble additive in an oil-based fluid. For example, an aqueous solution of polysaccharide is mixed with the oil-soluble additive and crosslinked prior to or soon after mixing with the oil-based wellbore fluid in order to trap the oil-soluble additive in the forming microsphere. In one embodiment, polysaccharide microspheres of the present disclosure may be present cross-linked and/or in a discrete particulate state rather than dissolved in the bulk solution as may be found in standard polymer solutions. The oil-soluble additive may then be released at a later time by disrupting the polysaccharide microsphere according to methods of the present disclosure at a designated time into the surrounding fluids. In some embodiments, polysaccharide microspheres may be used as a carrier for time-release of chemical additives such as crosslinking agents for other components present in a wellbore fluid, rheological modifiers, or polymer-forming species such as silicates or silylated polymers.

Polysaccharide microspheres in accordance with the present disclosure may be used for a variety of downhole applications including delivering fluid loss additives, film-formers, bridging agents, and creation of downhole structures. Once formed, polysaccharide microspheres may be isolated and added to various treatment fluid compositions. Treatment fluids may be aqueous or non-aqueous, and may be selected based on the treatment desired and on the specific polysaccharide used in formation of the microspheres.

Once crosslinked, polysaccharide microspheres may be filtered from the solution in some embodiments and dried using standard filter and drying equipment. In some embodiments, a continuous mix process may be selected and equipment may be sized and scaled accordingly. For example, in a lab scale embodiment, a polysaccharide is dissolved and hydrated in a blender. The resulting viscous fluid is agitated continuously, and then introduced into an oleaginous base fluid. The viscous polysaccharide solution may then separate into an internal phase of distinct domains or microspheres within the fluid. The ongoing agitation prevents gravity-based settling or agglomeration until an added crosslinker reacts with the polysaccharide solution to produce hardened microspheres.

Polysaccharide microspheres in accordance with the present disclosure may be used to stabilize emulsions in some embodiments. For example, a polysaccharide encapsulant may produce a hardened layer around an aqueous internal phase that capable of maintaining emulsion stability, particularly in applications where the surfactant becomes unstable or degrades prematurely.

In some embodiments, polysaccharide microspheres present in a circulating wellbore fluid may form a filter cake in the formation. For example, polysaccharide microspheres may be deposited as the fluid accumulates on the walls of a wellbore as a filter cake in some embodiments. After deposition into a filtercake, the polysaccharide microspheres may be degraded using the appropriate stimuli and release chemical agents to perform a number of functions depending on the particular wellbore operation, such as aiding filter cake degradation or strengthening the filter cake.

Polysaccharide Encapsulant

In one or more embodiments, polysaccharide microspheres may be produced from a number of polysaccharide encapsulants. Polysaccharide encapsulants in some embodiments may be polysaccharides that are crosslinked through ionic or covalent bonding to a crosslinking agent.

In or more embodiments, polysaccharide encapsulants may include alginates, guars, guar derivatives such as hydropropyl guar (HPG), carboxymethyl guar (CMG), and carboxymethylhydroxypropyl guar (CMHPG). Polysaccharide encapsulants may also include gums such as xanthan gum, diutan gum, and scleroglucan, cellulose derivatives such as hydroxyethylcellulose (HEC) or hydroxypropylcellulose (HPC), carboxymethylhydroxyethylcellulose (CMHEC), or the like.

Polysaccharide encapsulants may be combined with a crosslinker in some embodiments that facilitate intermolecular and intramolecular association of polysaccharide chains at the surface of a forming microsphere. Suitable crosslinkers may include polyvalent ions such as borates, or metal cations such as calcium, magnesium, chromium, iron, aluminum, titanium, antimony, and zirconium, or mixtures of polyvalent ions. In some embodiments, the crosslinker may be isolated from the polysaccharide encapsulant, depending on the application. For example, adding crosslinkers to a fluid may augment the viscosity and it may be desirable in some instances to delay such a reaction in order to decrease the pumping pressure required for delivery. In another embodiment, pH may be used to control the formation of ionic bonding between a polysaccharide encapsulant and a crosslinker. In such an arrangement, an emulsion containing a polysaccharide encapsulant in the aqueous phase may be kept at a low pH in order to protonate functional groups responsible for interacting with the crosslinker. When formation of the polysaccharide microspheres is desired, the pH may be then increased through the addition of a pH modifier such as a base or other buffering compound.

In particular embodiments, the polysaccharide microspheres may be designed such that an encapsulated reagent is released when exposed to shear forces, such as those that occur during injection of a wellbore fluid downhole. For example, an encapsulated reagent may be injected into a wellbore and as the wellbore fluid containing the encapsulated reagent is exposed to shear forces that occur as the fluid exits an opening in a tubular, drill string, or drill bit, the shear forces may disrupt the encapsulating material and release the reagent into the surrounding fluid. Thus, the release and delivery of an encapsulated reagent may be obtained by tuning the shear pressure of the fluid injection in the wellbore.

In one or more embodiments, the average particle size of the polysaccharide microspheres may range from a lower limit of 1 µm, 5 µm, and 10 µm, to an upper limit of 30 µm, 50 µm, and 100 µm, where the average particle size may range from any lower limit to any upper limit. Average particle size may be determined using a number of methods including light scattering, laser diffraction, sieve analysis, and the like.

In one or more embodiments, a polysaccharide encapsulant may be used to prepare an aqueous solution prior to crosslinking that may be combined with various additives that become entrained in the solution and later within the formed microsphere after crosslinking. Polysaccharide encapsulant solutions may be prepared at a concentration that ranges from 0.2 to 10.0 weight percent of aqueous solution in some embodiments, and from 1 to 8 weight percent in other embodiments.

In one or more embodiments, polysaccharide microspheres may be prepared to encapsulate additives and/or solvents, which are then delivered to a selected location downhole. In some embodiments, materials encapsulated in the polysaccharide microspheres may be released when activated at the bit when shear or pressure drop disrupts the microspheres. For example, an encapsulated component may be injected into a wellbore and shear forces that occur as the fluid exits an opening in a tubular, drill string, or drill bit, may disrupt the polysaccharide microspheres and release the encapsulated component.

Shear forces are closely related to the pressure drop experienced by a wellbore fluid passing through constrictions in various pumps, pipes, and drill-bits that may be present during a particular wellbore operation. This phenomenon is also known as the Venturi effect, which describes the physical process in which a fluid's velocity increases as it passes through a constriction to satisfy the principle of continuity, while its pressure decreases to satisfy the principle of conservation of mechanical energy. The greater the pressure differential between two particular stages that a wellbore fluid passes through (e.g., a change in diameter of a length of pipe or tubing), the greater the proportional pressure drop and shear force the fluid experiences. For example, shear forces may be highest when a fluid passes through narrow openings or nozzles on a drill bit or a port of completion string downhole. Thus, targeted delivery of the encapsulated materials may be achieved in some embodiments by tuning the durability of polysaccharide microspheres through concentration or crosslinking chemistry, by adjusting the pumping pressure of the wellbore fluids, or the opening sizes of the tools through which fluids are injected.

In one or more embodiments, polysaccharide microspheres may be designed such that the coating ruptures when exposed to shear forces that may range from 10,000 to 30,000 $s^{-1}$ in some embodiments, or from 12,000 to 25,000 $s^{-1}$ in other embodiments.

Breaker Agents

In some embodiments, degradation of polysaccharide microspheres may be initiated or accelerated by contact with a breaking agent that disrupts the crosslinks within the polysaccharide layer forming the microspheres, or degrades the backbone chain of the polysaccharide encapsulant.

In one or more embodiments, a breaking agent may include acids such as organic acids such as acetic acid and formic acid, or mineral acids such as phosphoric acid, hydrochloric acid, nitric acid, hydrobromic acid, hydrofluoric acid, perchloric acid, and the like. In some embodiments, polysaccharide microspheres may be injected with a delayed acid source that produces acid at a time period after combination, which may allow materials encapsulated in the microspheres to be delivered to greater depths in the wellbore and/or into the formation. Delayed acid sources may hydrolyze to form acids in situ, for example, by hydrolysis of an ester or anhydride to produce an organic acid. Illustrative examples of delayed acid sources in accordance with embodiments of the present disclosure include esters of carboxylic acids, anhydrides of carboxylic acids, esters of phosphonic acid, esters of sulfonic acid and other similar hydrolyzable compounds that are known to those skilled in the art.

In some embodiments, a delayed acid source may include an ester that hydrolyzes to produce the corresponding carboxylic acid. Suitable esters may include formic or acetic acid ester of a $C_4$-$C_{30}$ alcohol, which may be mono- or polyhydric. In one or more embodiments, a delayed acid source may include an aliphatic polyester such as polyglycolic acid, polylactic acid, polymers or co-polymers of esters that include, for example, substituted and unsubstituted polylactide, polyglycolide, polylactic acid, poly(lactic-co-glycolic acid), polyglycolic acid, poly(ε-caprolactone), and the like. In some embodiments, internal breakers in accordance with the present disclosure may contain one or more selected from homo- or copolymers of lactic acid and glycolic acid as well as compounds containing hydroxy, phenoxy, carboxylic, hydroxycarboxylic or phenoxycarboxylic moieties.

In some embodiments, chelating agents may be introduced into a fluid containing polysaccharide microspheres in order to trigger degradation by sequestering ionic species crosslinking the polysaccharide chains on the surfaces of the microspheres. Chelating agents suitable for use in the breaker fluids of the present disclosure may include polydentate chelating agents such as ethylenediaminetetraacetic acid, diethylenetriaminepentaacetic acid, nitrilotriacetic acid, ethylene glycol-bis(2-aminoethyl)-N,N,N',N'-tetraacetic acid, 1,2-bis(o-aminophenoxy)ethane-N,N,N',N'-tetraacetic acid, cyclohexanediaminete-traacetic acid, triethylenetetraaminehexaacetic acid, N-(2-Hydroxyethyl) ethylenediamine-N,N'N'-triacetic acid, glutamic-N,N-diacetic acid, ethylene-diamine tetra-methylene sulfonic acid, diethylene-triamine penta-methylene sulfonic acid, amino tri-methylene sulfonic acid, ethylene-diamine tetra-methylene phosphonic acid, diethylene-triamine penta-methylene phosphonic acid, amino tri-methylene phosphonic acid, and mixtures thereof. Such chelating agents may include potassium or sodium salts thereof in some embodiments. However, this list is not intended to have any limitation on the chelating agents (or salt types) suitable for use in the embodiments disclosed herein.

In one or more embodiments, polysaccharide microspheres may also be degraded by adding an enzyme to degrade glycosidic linkages in the constituent polysaccharide. Natural polymer degrading enzymes in accordance with the present disclosure may be selected from, for example, carbohydrases, amylases, pullulanases, and cellulases. In some embodiments, the enzyme may be selected from endo-amylase, exo-amylase, isoamylase, glucosidase, amylo-glucosidase, malto-hydrolase, maltosidase, isomalto-hydrolase, malto-hexaosidase, or alginate lyase. One skilled in the art would appreciate that selection of an enzyme may depend on various factors such as the type of polymeric additive used in the wellbore fluid being degraded, the temperature of the wellbore, and the pH of wellbore fluid.

Wellbore Fluids

Wellbore fluids may contain a base fluid that is entirely aqueous base or contains a full or partial oil-in-water or water-in-oil emulsion. In some embodiments, the wellbore fluid may be any water-based fluid that is compatible with the accretion inhibiting compositions disclosed herein. In some embodiments, the fluid may include at least one of fresh water, mixtures of water and water soluble organic compounds and mixtures thereof.

Wellbore fluids in accordance with the present disclosure may also include oleaginous base fluids such as natural or synthetic oils, including diesel oil, mineral oil, hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof, and similar compounds known to one of skill in the art.

In various embodiments, the wellbore fluid may contain a brine such as seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, lithium, and salts of chlorides, bromides, carbonates, iodides, chlorates, bromates, formates, nitrates, oxides, sulfates, phosphates, silicates and fluorides. Salts that may be incorporated in a given brine include any one or more of those present in natural seawater or any other organic or inorganic dissolved salts. Additionally, brines that may be used in the drilling fluids disclosed herein may be natural or synthetic, with synthetic brines tending to be much simpler in constitution. One of ordinary skill would appreciate that the above salts may be present in the base fluid or may be added according to the method disclosed herein. Further, the amount of the aqueous based continuous phase should be sufficient to form a water based drilling fluid. This amount may range from nearly 100% of the wellbore fluid to less than 30% of the wellbore fluid by volume. In some embodiments, the aqueous based continuous phase may constitute from about 95 to about 30% by volume or from about 90 to about 40% by volume of the wellbore fluid.

Example

A method may be shown for producing polysaccharide microspheres in an invert emulsion in accordance with the present disclosure. A 2% by weight solution of sodium alginate was prepared and mixed into a divalent cation-free brine. The mixture was then emulsified into a mineral oil base fluid. Next, the alginate in the dispersed aqueous phase was crosslinked by adding a dilute calcium chloride solution. Upon addition of a the calcium chloride to the invert emulsion, the water droplets crosslinked almost instantaneously, and the internal aqueous phase droplets became encapsulated in a relatively mechanically strong microsphere. Formation of microspheres was verified by optical microscopy.

Although the preceding description has been described herein with reference to particular means, materials, and embodiments, it is not intended to be limited to the particulars disclosed herein; rather, it extends to all functionally equivalent structures, methods and uses, such as are within the scope of the appended claims.

What is claimed is:

1. A method comprising:
   emplacing a wellbore fluid into a wellbore, the wellbore fluid comprising an oleaginous fluid and one or more polysaccharide microspheres, and
   degrading the one or more polysaccharide microspheres by shearing the wellbore fluid through constrictions in one or more selected from the group consisting of a pump, a pipe and a drill bit; wherein the polysaccharide microspheres encapsulate an oil-soluble additive.

2. The method of claim 1, wherein the polysaccharide microspheres have an average particle size within the range of 1 μm to 100 μm.

3. The method of claim 1, wherein the polysaccharide microspheres comprise an alginate.

4. The method of claim 1, wherein the shearing of the wellbore fluid occurs at a force ranging from 12,000 s$^{-1}$ to 25,000 s$^{-1}$.

5. The method of claim 1, wherein the oil-soluble additive is selected from the group consisting of crosslinking agents for other components present in the wellbore fluid, rheological modifiers and polymer-forming species.

6. The method of claim 5, wherein the oil-soluble additive is the polymer-forming species, and the polymer-forming species are selected from the group consisting of silicates and silylated polymers.

7. A method comprising:

emplacing a wellbore fluid into a wellbore, the wellbore fluid comprising an oleaginous fluid and one or more polysaccharide microspheres, wherein the one or more polysaccharide microspheres encapsulate a polymer-forming species selected from the group consisting of silicates and silylated polymers, and degrading the one or more polysaccharide microspheres, wherein degrading the one or more polysaccharide microspheres occurs by shearing at a force ranging from 12,000 s−1 to 25,000 s−1.

8. A method comprising:

emplacing a wellbore fluid into a wellbore, the wellbore fluid comprising an oleaginous fluid and one or more polysaccharide microspheres, wherein the one or more polysaccharide microspheres encapsulate an oil-soluble additive selected from the group consisting of crosslinking agents for other components present in the wellbore fluid, rheological modifiers and polymer-forming species, and degrading the one or more polysaccharide microspheres, wherein degrading the one or more polysaccharide microspheres occurs by shearing at a force ranging from 12,000 s−1 to 25,000 s−1.

* * * * *